United States Patent
Verbrugge et al.

(10) Patent No.: US 12,009,503 B2
(45) Date of Patent: Jun. 11, 2024

(54) ELECTROACTIVE PARTICLES HAVING ELECTRONICALLY CONDUCTIVE COATINGS

(71) Applicant: GM GLOBAL TECHNOLOGY OPERATIONS LLC, Detroit, MI (US)

(72) Inventors: Mark W. Verbrugge, Troy, MI (US); Xingcheng Xiao, Troy, MI (US); Qinglin Zhang, Novi, MI (US); Xingyi Yang, Sterling Heights, MI (US); Raghunathan K, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 692 days.

(21) Appl. No.: 17/039,034

(22) Filed: Sep. 30, 2020

(65) Prior Publication Data

US 2022/0102704 A1    Mar. 31, 2022

(51) Int. Cl.
*H01M 4/1395* (2010.01)
*H01M 4/04* (2006.01)
*H01M 4/134* (2010.01)

(52) U.S. Cl.
CPC ....... *H01M 4/1395* (2013.01); *H01M 4/0452* (2013.01); *H01M 4/134* (2013.01)

(58) Field of Classification Search
None
See application file for complete search history.

(56) References Cited

U.S. PATENT DOCUMENTS 8,440,350 B1   5/2013  Verbrugge et al.
8,859,144 B2  10/2014  Xiao
(Continued)

FOREIGN PATENT DOCUMENTS

CN    1348225 A    5/2002
CN  108431997 A    8/2018
(Continued)

OTHER PUBLICATIONS

Xiao, Xingcheng et al., U.S. Appl. No. 16/752,192 filed Jan. 24, 2020 entitled, "Manufacturing Process of Making Negative Electrodes for Batteries," 68 pages.
(Continued)

*Primary Examiner* — Tracy M Dove
(74) *Attorney, Agent, or Firm* — Harness, Dickey & Pierce, P.L.C.

(57) ABSTRACT

The present disclosure relates to a negative electrode material and methods of preparation and use relating thereto. The electrode material comprises a plurality of electroactive material particles, where each electroactive material particle includes an electroactive material core and an electronically conductive coating. The method includes contacting an electroactive material precursor including a plurality of electroactive material particles with a solution so as to form an electronically conductive coating on each of the electroactive material particles. The solution includes a solvent and one or more of copper fluoride ($CuF_2$), titanium tetrafluoride ($TiF_3$ or $TiF_4$), iron fluoride ($FeF_3$), nickel fluoride ($NiF_2$), manganese fluoride ($MnF_2$, $MnF_3$, or $MnF_4$), and vanadium fluoride ($VF_3$, $VF_4$, $VF_5$). The electronically conductive coating includes a plurality of first regions and a plurality of second regions. The plurality of first regions include lithium fluoride. The plurality of second regions include one of copper, titanium, iron, nickel, manganese, and vanadium.

15 Claims, 4 Drawing Sheets

(56) References Cited

U.S. PATENT DOCUMENTS

| | | | |
|---|---|---|---|
| 8,999,584 B2 | 4/2015 | Jiang et al. | |
| 9,005,811 B2 | 4/2015 | Xiao et al. | |
| 9,093,705 B2 | 7/2015 | Xiao et al. | |
| 9,142,830 B2 | 9/2015 | Xiao et al. | |
| 9,302,914 B2 | 4/2016 | Liu et al. | |
| 9,362,551 B2 | 6/2016 | Sachdev et al. | |
| 9,379,374 B2 | 6/2016 | Liu et al. | |
| 9,531,004 B2 | 12/2016 | Xiao et al. | |
| 9,564,639 B2 | 2/2017 | Huang | |
| 9,570,752 B2 | 2/2017 | Huang et al. | |
| 9,577,251 B2 | 2/2017 | Xiao et al. | |
| 9,780,361 B2 | 10/2017 | Xiao et al. | |
| 10,062,898 B2 | 8/2018 | Xiao | |
| 10,164,245 B2 | 12/2018 | Huang | |
| 11,664,529 B2 * | 5/2023 | Maurano | H01M 10/058 429/209 |
| 2016/0190597 A1 * | 6/2016 | Kim | H01M 4/582 252/182.1 |
| 2018/0205114 A1 | 7/2018 | Pauric et al. | |
| 2020/0020948 A1 | 1/2020 | Huang et al. | |
| 2020/0020949 A1 | 1/2020 | Huang | |
| 2020/0035998 A1 | 1/2020 | Lu et al. | |
| 2020/0119339 A1 | 4/2020 | Halalay et al. | |
| 2020/0127292 A1 | 4/2020 | Halalay et al. | |
| 2020/0220153 A1 | 7/2020 | Xiao et al. | |
| 2020/0220154 A1 | 7/2020 | Xiao et al. | |
| 2020/0381707 A1 * | 12/2020 | Ji | H01M 4/0445 |
| 2021/0194049 A1 * | 6/2021 | Chang | H01M 50/42 |
| 2021/0234153 A1 | 7/2021 | Xiao et al. | |

FOREIGN PATENT DOCUMENTS

| | | |
|---|---|---|
| CN | 108565398 A | 9/2018 |
| CN | 109728249 A | 5/2019 |
| CN | 111384399 A | 7/2020 |
| CN | 111564628 A | 8/2020 |
| CN | 114335434 A | 4/2022 |
| DE | 102021111233 A1 | 3/2022 |

OTHER PUBLICATIONS

Xiao, Xingcheng et al., "Regulated Breathing Effect of Silicon Negative Electrode for Dramatically Enhanced Perofrmance of Li-Ion Battery," Adv. Funct. Mater. (2015), vol. 25, Iss, 9, pp. 1426-1433; Published Jan. 21, 2015, DOI: 10.1002/adfm. 201403629.

First Office Action for Chinese Patent Application No. 202110512606.3 dated Oct. 20, 2023, with correspondence from China Patent Agent (H.K.) Ltd. summarizing Office Action; 9 pages.

* cited by examiner

ELECTROACTIVE PARTICLES HAVING ELECTRONICALLY CONDUCTIVE COATINGS

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

In various instances, however, a portion of the intercalated lithium remains with the negative electrode following the first cycle due to, for example, conversion reactions and/or the formation of a solid electrolyte interphase (SEI) layer on the negative electrode during the first cycle, as well as ongoing lithium loss due to, for example, continuous solid electrolyte interphase breakage. Such permanent loss of lithium ions may result in a decreased specific energy and power in the battery resulting from, for example, added positive electrode mass that does not participate in the reversible operation of the battery. For example, the lithium-ion battery may experience an irreversible capacity loss of greater than or equal to about 5% and less than or equal to about 30% after the first cycle, and in the instance of silicon-containing negative electrodes, an irreversible capacity loss of greater than or equal to about 20% and less than or equal to about 40% after the first cycle. Accordingly, it would be desirable to develop improved electrodes and electroactive materials, and methods of making and using the same, that can address these challenges.

SUMMARY

This section provides a general summary of the disclosure, and is not a comprehensive disclosure of its full scope or all of its features.

The present disclosure relates to an electrode material, for example a negative electrode material, for use within an electrochemical cell, and methods of preparation and use relating thereto. The electrode material comprises a plurality of electroactive material particles, where each electroactive material particle includes an electroactive material core and an electronically conductive coating.

In various aspects, the present disclosure provides a method for preparing an electrode material for use in an electrochemical cell. The method includes contacting an electroactive material precursor including a plurality of electroactive material particles with a solution so as to form an electronically conductive coating on each of the electroactive material particles, where the coated electroactive material particles define the electrode material. The solution includes a solvent and one or more of copper fluoride ($CuF_2$), titanium tetrafluoride ($TiF_4$), titanium trifluoride ($TiF_3$), iron fluoride ($FeF_3$), nickel fluoride ($NiF_2$), manganese fluoride ($MnF_2$, $MnF_3$, or $MnF_4$), and vanadium fluoride ($VF_3$, $VF_4$, $VF_5$). The electronically conductive coating includes a plurality of first regions and a plurality of second regions. The plurality of first regions include lithium fluoride. The plurality of second regions include one of copper, titanium, iron, nickel, manganese, and vanadium.

In one aspect, the electroactive material precursor is prelithiated.

In one aspect, the method further includes prelithiating the electroactive material precursor.

In one aspect, the electroactive material precursor may be prelithiated using a thermal evaporation process.

In one aspect, the electroactive material particles includes silicon.

In one aspect, the solvent may be selected from the group consisting of: dimethyl ether, hexane, toluene, and combinations thereof.

In one aspect, contacting may occur by using one of a spray process and a dip process.

In one aspect, the method further include drying the coated electroactive material particles so as to remove the solvent.

In one aspect, the method further include applying a vacuum infiltration process so as to surround the electroactive material precursor with the solution.

In one aspect, the electronically conductive coating may be a result of a conversion reaction between the solution and the electroactive material particles.

In one aspect, the electroactive material precursor includes prelithiated silicon and the solution includes copper fluoride ($CuF_2$). The conversion reaction may be defined as $y(CuF_2)+Li_xSi \rightarrow 2y(LiF)+Li_{(x-2y)}Si+yCu$, where $x>2y$.

In various aspects, the present disclosure provides a method for preparing an electrode material for use in an electrochemical cell. The method may include prelithiating a silicon-containing electroactive material precursor so as to form a prelithiated silicon-containing electroactive material and contacting the prelithiated silicon-containing electroactive material with a solution comprising a solvent and one or more of copper fluoride ($CuF_2$), titanium tetrafluoride ($TiF_4$), iron fluoride ($FeF_3$), nickel fluoride ($NiF_2$), manganese fluoride ($MnF_2$, $MnF_3$, or $MnF_4$), and vanadium fluoride ($VF_3$, $VF_4$, $VF_5$) so as to form an electronically conductive coating on the prelithiated silicon-containing electroactive material where the coated prelithiated electroactive material defines the electrode material. The electronically conductive coating includes a plurality of first regions and a plurality of second regions. The plurality of first regions may include lithium fluoride and the plurality of second regions may include one of copper, titanium, iron, nickel, manganese, and vanadium.

In one aspect, the method further includes drying the coated prelithiated electroactive material so as to remove the solvent.

In one aspect, the method further includes applying a vacuum infiltration process so as to surround the prelithiated silicon-containing electroactive material with the solution.

In one aspect, the solvent may be selected from the group consisting of: dimethyl ether, hexane, toluene, and combinations thereof.

In one aspect, the electronically conductive coating may be a result of a conversion reaction between the solution and the prelithiated silicon-containing electroactive material.

In one aspect, the solution includes copper fluoride ($CuF_2$). The conversion reaction may be defined as $y(CuF_2)+Li_xSi \rightarrow 2y(LiF)+Li_{(x-2y)}Si+yCu$, where $x>2y$.

In various aspects, the present disclosure provides an electrode material for use in an electrochemical cell. The electrode material includes a plurality of electroactive material particles. Each electroactive material particle includes an electroactive material core, and an electronically conductive coating surrounding the electroactive material core. The electronically conductive coating includes a plurality of first regions and a plurality of second regions. The plurality of first regions may include lithium fluoride. The plurality of second regions may include one of copper, titanium, iron, nickel, manganese, and vanadium.

In one aspect, the electroactive material core is a prelithiated electroactive material core.

In one aspect, a thickness of the electronically conductive coating is greater than or equal to about 1 nm and less than or equal to about 50 nm.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising" is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

The current technology relates to an electrode material, for example a negative electrode material, for use within an electrochemical cell, and methods of preparation and use relating thereto. The electrode material comprises a plurality of electroactive material particles, where each electroactive material particle includes an electroactive material core and an electronically conductive coating. The electroactive material core may be prelithiated. Prelithiation of the electroactive material may create a lithium reservoir in the electrochemical cell that can compensate for lithium lost during cycling, in particular, during the first cycle, so as to decrease capacity loss over time. The electronically conductive coating may improve stability of the electroactive material and rate capabilities for fast charge. The electronically conductive coating may also reduce mechanical degradation and minimizes any increases in surface roughness during initial and subsequent lithiation/delithiation cycles. The conductivity of the coating can reduce the amount of conductive additive(s) required in the electrochemical cell so as to improve energy density and lower cell cost.

Figure 1:
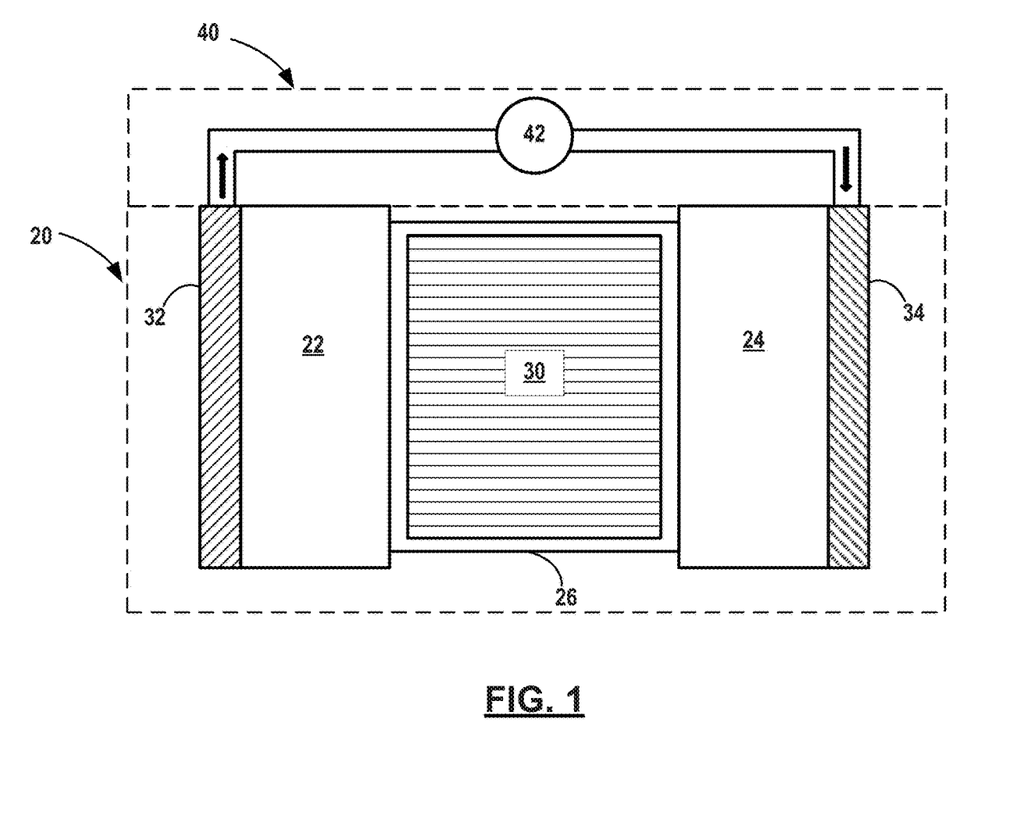
FIG. 1 is a schematic of an example electrochemical battery cell.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions (or sodium ions in the case of sodium-ion batteries, and the like) and may be in liquid, gel, or solid form. For example, an exemplary and schematic illustration of an electrochemical cell (also referred to as the battery) 20 is shown in FIG. 1.

Such cells can be used in vehicle or automotive transportation applications (e.g., motorcycles, boats, tractors, buses, mobile homes, campers, and tanks). However, the current technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

Although the illustrated examples include a single cathode and a single anode, the skilled artisan will recognize that the current teachings extend to various other configurations, including those having one or more cathodes and one or more anodes, as well as various current collectors with electroactive layers disposed on or adjacent to one or more surfaces thereof. Likewise, although the following discussion is directed to electrochemical cells that cycle lithium ions, the skilled artisan will appreciate that the current technology similarly applies to electrochemical cells that cycle any of sodium (Na), potassium (K), and/or tin (Sn) ions.

The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte 30. For example, the separator 26 may be defined by a plurality of solid-state electrolyte particles (not shown).

A negative electrode current collector 32 may be positioned at or near the negative electrode 22, and a positive electrode current collector 34 may be positioned at or near the positive electrode 24. The negative electrode current collector 32 may be a metal foil, metal grid or screen, or expanded metal comprising copper or any other appropriate electrically conductive material known to those of skill in the art. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode 24. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the current technology also applies to solid-state batteries that include solid-state electrolytes (and solid-state electroactive particles) that may have a different design, as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), and combinations thereof.

These and other similar lithium salts may be dissolved in a variety of non-aqueous aprotic organic solvents, including, but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

In various aspects, the porous separator 26 and the electrolyte 30 in FIG. 1 may be replaced with a solid-state electrolyte ("SSE") (not shown) that functions as both an electrolyte and a separator. The solid-state electrolyte may be disposed between the positive electrode 24 and negative electrode 22. The solid-state electrolyte facilitates transfer of lithium ions, while mechanically separating and providing electrical insulation between the negative and positive electrodes 22, 24. By way of non-limiting example, solid-state electrolytes may include $LiTi_2(PO_4)_3$, $LiGe_2(PO_4)_3$, $Li_7La_3Zr_2O_{12}$, $Li_3xLa_{2/3}-xTiO_3$, $Li_3PO_4$, $Li_3N$, $Li_4GeS_4$, $Li_{10}GeP_2S_{12}$, $Li_2S-P_2S_5$, $Li_6PS_5Cl$, $Li_6PS_5Br$, $Li_6PS_5I$, $Li_3OCl$, $Li_{2.99} Ba_{0.005}ClO$, or combinations thereof.

The positive electrode 24 may be formed from a lithium-based active material (or a sodium-based active material in the instance of sodium-ion batteries) that is capable of undergoing lithium intercalation and deintercalation, alloying and dealloying, or plating and stripping, while functioning as the positive terminal of the battery 20. The positive electrode 24 can be defined by a plurality of electroactive material particles (not shown) disposed in one or more layers so as to define the three-dimensional structure of the positive electrode 24. The electrolyte 30 may be introduced, for example after cell assembly, and contained within pores (not shown) of the positive electrode 24. For example, the positive electrode 24 may include a plurality of electrolyte particles (not shown).

One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$), lithium manganese-iron phosphate ($LiMn_{2-x}Fe_xPO_4$, where $0<x<0.3$), or lithium iron fluorophosphate ($Li_2FePO_4F$).

In certain variations, the positive electroactive materials may be optionally intermingled with an electronically conducting material that provides an electron conduction path and/or at least one polymeric binder material that improves the structural integrity of the electrode. For example, the positive electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, the negative electrode 22 may include a plurality of electrolyte particles (not shown).

The negative electrode 22 may include a negative electroactive material that is silicon-based comprising silicon, for example, lithium-silicon and silicon containing binary and ternary alloys and/or tin-containing alloys, such as Si—Sn, SiSnFe, SiSnAl, SiFeCo, $SnO_2$, and the like.

In certain variations, the negative electroactive material in the negative electrode 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (Li-PAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN' black or DENKA' black), carbon fibers and nanotubes, graphene, and the like. Examples of a conductive polymer include polyaniline, polythiophene, polyacetylene, polypyrrole, and the like.

As discussed above, during discharge, the negative electrode 22 may contain a comparatively high concentration of intercalated lithium, which is oxidized into lithium ions and electrons. Lithium ions may travel from the negative electrode 22 to the positive electrode 24, for example, through the ionically conductive electrolyte 30 contained within the pores of an interposed porous separator 26. Concurrently, electrons pass through an external circuit 40 from the negative electrode 22 to the positive electrode 24. Such lithium ions may be assimilated into the material of the positive electrode 22 by an electrochemical reduction reaction. The battery 20 may be recharged or regenerated after a partial or full discharge of its available capacity by an external power source, which reverses the electrochemical reactions that transpired during discharge. In various instances, however, especially in instances of silicon-containing electroactive materials, a portion of the intercalated lithium remains with the negative electrode 22 for example, conversion reactions and/or the formation of a solid electrolyte interphase (SEI) layer (not shown) on the negative electrode 22 during the first cycle, as well as ongoing lithium loss due to, for example, continuous solid electrolyte interphase breakage. This permanent loss of lithium ions may result in a decreased specific energy and power in the battery 20. The current technology provides improved electroactive and electrode materials, and methods of making the same, which can address these challenges.

For example, in various aspects, the battery 20 may be lithiated so as to create a lithium reservoir. Electroactive materials (or electrodes incorporating electroactive materials) can be lithiated prior to forming an electrode. In particular, the negative electroactive material (e.g., silicon) can be lithiated prior to the formation of the negative electrode 22. For example, an amount of lithium prelithiation together with appropriate negative electrode capacity and/or positive electrode capacity ratio (N/P ratio) can be used to control electrochemical potential within an appropriate window so as to improve the cycle stability of the battery 20. Prelithiation can drive down the potential for silicon-containing electrodes. By way of non-limiting example, lithiation of silicon by direct reaction can be expressed (at room temperature) by $3.75xLi+Si \rightarrow Li_{3.75x}Si$, where $0 \leq x \leq 1$, while for electrochemical lithiation of silicon, it can be expressed as $3.75xLi^+ + 3.75xe^- + Si \rightarrow Li_{3.75x}Si$. In each instance, the reserved lithium can compensate for lithium lost during cycling, including during the first cycle, so as to decrease capacity loss over time.

Figure 2:
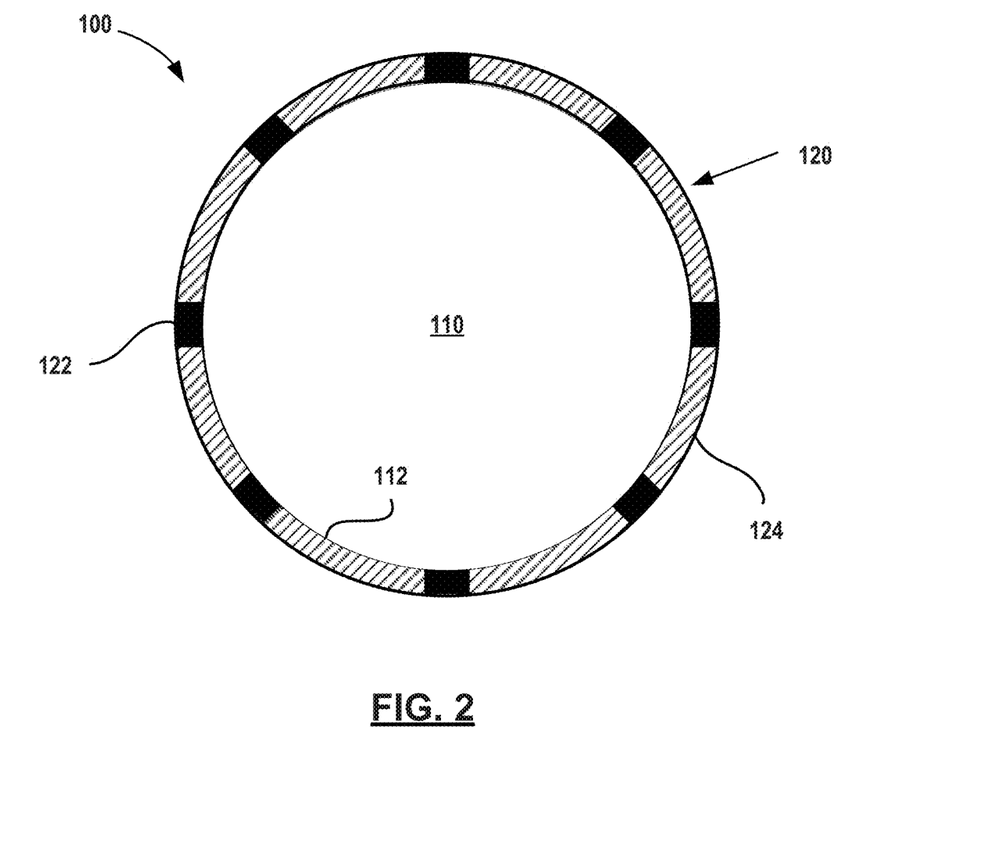
FIG. 2 is a cross-sectional illustration of a pre-lithiated negative electroactive material particle having an electronically conductive coating in accordance with various aspects of the current technology.

In further instances, electroactive materials, including pre-lithiated electroactive materials, may include an electronically conductive (protective) coating. For example, FIG. 2 illustrates a negative electroactive particle 100 comprising a pre-lithiated electroactive material core 110 and having an electronically conductive coating 120. The negative electrode 22 may be defined by a plurality of such electroactive material particles 100. In particular, such electroactive material particles 100 may be disposed in one or more layers so as to define the three-dimensional structure of the negative electrode 22.

As illustrated in FIG. 2, negative electroactive particle 100 comprises a pre-lithiated electroactive material core 110 and an electronically conductive coating 120 disposed on exposed surfaces 112 of (i.e., encompassing) the electroactive material core 110. In various aspects, the electronically conductive coating 120 is a continuous layer applied to the surface 112 of the pre-lithiated electroactive material core 110. For example, the electronically conductive coating 120 can cover greater than or equal to about 90% to less than or equal to about 100%, optionally greater than or equal to about 95% to less than or equal to about 100%, and in certain aspects, optionally greater than or equal to about 99% to less than or equal to about 100%, of the exposed surface area of the electroactive material core 110. In certain instances, the electronically conductive coating 120 may have a thickness of greater than or equal to about 1 nm and less than or equal to about 1000 nm, optionally greater than or equal to about 2 nm and less than or equal to about 20 nm, and in certain variations, optionally greater than or equal to about 3 nm and less than or equal to about 10 nm, for example, about 5 nm.

The electroactive material core 110 includes a pre-lithiated electroactive material. The electroactive material can include lithium-silicon and silicon containing binary and ternary alloys and/or tin-containing alloys, such as Si—Sn, SiSnFe, SiSnAl, SiFeCo, $SnO_2$, and the like. Such electroactive materials may undergo significant volume expansion during lithium cycling, for example, during lithium ion intercalation or lithium alloying. In an initial state prior to any lithium ion insertion or reaction—for example, prior to lithiation—such electroactive material particles may exist in a first or contracted state. After lithium ion insertion—for example, after lithiation—the lithiated electroactive material particles may exist in a second or expanded state. In the first (contracted) state, the electroactive material particles may comprise silicon. In the second (expanded) state, the lithiated electroactive material particles ($Li_xSi$, where $0 \leq x \leq 3.75$), which define the electroactive material core 110, can have a volume that is up to three times (300%) larger than the volume of the electroactive material particles in the first (contracted) state.

In certain variations, in the first (contracted) state, the electroactive material particles may have an average particle size (D50) greater than or equal to about 10 nm and less than or equal to about 50 µm, optionally greater than or equal to about 50 nm and less than or equal to about 10 µm, and in certain variations, optionally from greater than or equal to about 150 nm and less than or equal to about 5 µm. In the second (expanded) state, the electroactive material particles may have an average particle size (D50) greater than or equal to about 500 nm and less than or equal to about 4 µm, optionally greater than or equal to about 750 nm and less than or equal to about 3 µm, and in certain variations, optionally from greater than or equal to about 1 µm and less than or equal to about 3 µm. The electroactive material core 110 may have an average particle size (D50) greater than or equal to about 100 nm and less than or equal to about 20 µm, optionally greater than or equal to about 500 nm and less than or equal to about 5 µm, and in certain variations, optionally from greater than or equal to about 1 µm and less than or equal to about 5 µm.

The electronically conductive coating 120 may be a speckled coating including a plurality of first regions 122 and a plurality of second regions 124. Each first region of the plurality 122 includes lithium fluoride (LiF). In other instances, the first region of the plurality 122 includes certain oxides and/or nitrides. Each second region of the plurality 124 includes one or more conductive metals selected from the group consisting of copper (Cu), aluminum (Al), titanium (Ti), tin (Sn), zirconium (Zr), vanadium (V), hafnium (Hf), zinc (Zn), silicon (Si), lithium (Li), nickel (Ni), manganese (Mn), magnesium (Mg), and combinations thereof. Incorporation of the one or more conductive metals reduces the need for conductive additives (electrically conductive materials) within the electrode 22. For example, the battery 20, which includes the negative electrode 22 that comprises a plurality of negative electroactive particle 100, may include less than or equal to about 1 wt. % of one or more conductive additives. Further still, the presence of the one or more conductive metals can increase the electrical conductivity of the battery 20 and can improve rate capability for fast charge. The electrical conductivity of the battery 20 should be less than about 1 S/m. The electronically conductive coating 120 can generally facilitate charge transfer. Further, the presence of the protective coating can better passivate the electrode after prelithiation occurs therefore suppressing the electrolyte decomposition and extending battery life.

Though not illustrated, the skilled artisan will appreciate that in certain variations, the negative electroactive particle 100 may further include one or more additional coatings disposed, for example, on exposed surfaces of the electronically conductive coating 120, and in other instances on the surface of the negative electroactive particle 100 prior to the formation of the electronically conductive coating 120. Such additional coatings may provide further stabilization of the lithiated material during shipping and handling. The additional coating or coatings may include, for example, carbon and/or alumina. These additional coatings may have improved performance in the present instance upon the occurrence of volume expansion and contraction as a result of the underlying electronically conductive coating 120. Known methods may be used to apply such additional coatings to the negative electroactive particles 100.

In various aspects, the present disclosure provides a method of making a negative electrode material, such as negative electroactive particle 100 illustrated in FIG. 2. The method is a continuous process generally comprising a first step that includes lithiating an electroactive material and a second step that includes applying an electrically-conductive conversion coating ("ECCC"). More specifically, the method may include immersing an electrode including a plurality of prelithiated electroactive material particles (e.g., prelithiated silicon-containing electroactive material particles) in a solution, where the solution includes one or more of copper fluoride ($CuF_2$), titanium tetrafluoride ($TiF_4$), titanium trifluoride ($TiF_3$), iron fluoride ($FeF_3$), nickel fluoride ($NiF_2$), manganese fluoride ($MnF_2$, $MnF_3$, or $MnF_4$), and vanadium fluoride ($VF_3$, $VF_4$, $VF_5$), in a solvent, for example a low-polarity, aprotic solvent like dimethyl ether (DME), hexane, toluene, and the like. Immersing may include, for example only, a spray process and/or a dip process.

The method may further include pulling or drawing the solution into the electrode pores (for example, using vacuum infiltration) and/or drying the electrode (for example, using a vacuum for about 5 minutes) so as to remove the solvent, during which a conversion reaction occurs so as to form a surface coating on the exposed surfaces of the prelithiated electroactive material particles. The conversion reaction occurs when the prelithiated electroactive material particles contacts the solution.

For example, when the solution includes copper fluoride ($CuF_2$) and the prelithiated electroactive material particles are prelithiated silicon-containing electroactive material particles, the conversion reaction may be defined by:

where x>2y (for example, $0 \leq y \leq 1.875$ and $0 \leq x \leq 3.75$) such that all of the copper fluoride ($CuF_2$) or the like is utilized.

In other instances, for example, when the solution includes titanium tetrafluoride ($TiF_4$) and the prelithiated electroactive material particles are prelithiated silicon-containing electroactive material particles, the conversion reaction may be defined by:

where x>4y (for example, $0 \leq y \leq 0.9375$ and $0 \leq x \leq 3.75$) such that all of the titanium tetrafluoride ($TiF_4$) or the like is utilized.

In further instances, for example, when the solution includes iron fluoride ($FeF_3$) and the prelithiated electroactive material particles are prelithiated silicon-containing electroactive material particles, the conversion reaction may be defined by:

where x>4y (for example, 0≤y≤1.25 and 0≤x≤3.75) such that all of the iron fluoride (FeF$_3$) or the like is utilized.

In still other instances, for example, when the solution includes nickel fluoride (NiF$_2$) and the prelithiated electroactive material particles are prelithiated silicon-containing electroactive material particles, the conversion reaction may be defined by:

$$y(NiF_2) + Li_xSi \rightarrow 2y(LiF) + Li_{(x-2y)}Si + yNi$$

where x>2y (for example, 0≤y≤1.875 and 0≤x≤3.75) such that all of the nickel fluoride (NiF$_2$) or the like is utilized.

In each instance, the amount of lithium prelithiated into the electroactive material particles (e.g., silicon-containing electroactive material particles) can be controlled such that copper fluoride (CuF$_2$) or the like can be fully reacted, while retaining sufficient lithium with the electroactive material particles so as to achieve desired energy densities (e.g., >250 wh/kg, >530 wh/l). The lithium fluoride and the copper (or like) together form the protective (electronically conductive) coating and the lithiated silicon defines an electroactive material core. The lithium fluoride may improve cycle life performance of an electrochemical cell including the negative electrode material, while the copper may improve rate capabilities of the electrochemical cell. Moreover, lithium fluoride can passivate the lithiated silicon so as to make the electroactive material particle dry-air stable and so as to suppress electrolyte decomposition in the cells.

Figure 3:
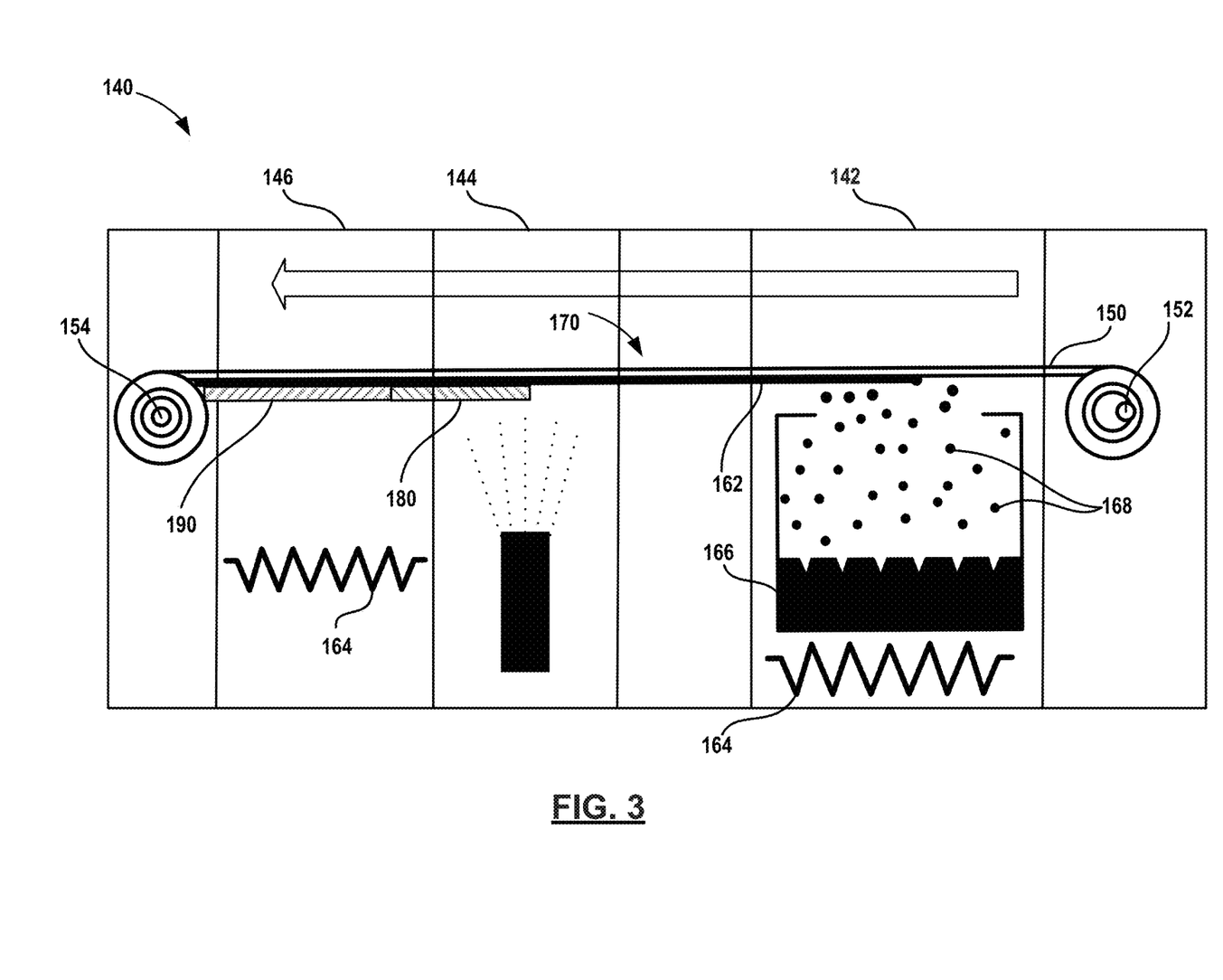
FIG. 3 is an illustration of a continuous process for forming pre-lithiated negative electroactive material particles having electronically conductive coating in accordance with various aspects of the current technology.

As illustrated in FIG. 3, in certain variations, a negative electrode material, such as negative electroactive particle 100 illustrated in FIG. 2, may be prepared using a roll-to-roll continuous process, where an electrode precursor material 150 is unrolled from a first reel or roll 152, introduced into the reactor 140, and transported through a series of reaction chambers 142, 144, 146 prior to being spooled again to form a second roll 154. The skilled artisan will appreciate, in various instances, the electrode precursor material 150 may be an elongated sheet of prefabricated electrode material, which may be spooled and unrolled as shown, or alternatively, may be discrete sheets that are transported on a conveyor or a plurality of electroactive material particles conveyed on a belt that may be distributed onto the conveyer and collected after treatment in the reactor 140.

The electrode precursor material 150 may be lithiated in a first reaction chamber 142. In certain variations, lithiation occurs by a thermal evaporation process. In the thermal evaporation process, a vacuum pump (not shown) may be used to maintain a pressure (e.g., <10$^{-3}$ Torr) in the first reaction chamber 142. The process uses increases in vapor pressure and applied heat to evaporate a source material 166 (e.g., lithium metal). The evaporate is deposited on an exposed surface of a substrate (here, an electrode precursor material comprising, for example, silicon), which is often substantially cooler than the evaporate. For example, a heater 164 may be disposed below the source material 166. As the temperature of the lithium metal 166 increases (e.g., >50° C. higher than its melting point), lithium metal evaporates or volatilizes and lithium molecules 168 are directed toward and deposited on an exposed surface of the electrode precursor material 150. Where a thermal evaporation process is used, a thickness of the applied layer 162 may be greater than or equal to about 1 μm and less than or equal to about 50 μm, optionally greater than or equal to about 2 μm and less than or equal to about 20 μm, in certain variations, optionally greater than or equal to about 3 nm and less than or equal to about 10 μm of the lithium metal.

The prelithiated electrode material 170 travels from the first reaction chamber 142 to a second reaction chamber 144. In the second reaction chamber 144, as illustrated in FIG. 3, a coating precursor 180 is disposed on an exposed surface of the prelithiated electrode material 170. The coating precursor 180 may be disposed on the surface of the prelithiated electrode material 170 using any known method, such as, for example only, a spray process or a dip process. The coating precursor 180 includes one or more of copper fluoride (CuF$_2$), titanium tetrafluoride (TiF$_4$), titanium trifluoride (TiF$_3$), iron fluoride (FeF$_3$), nickel fluoride (NiF$_2$), manganese fluoride (MnF$_2$, MnF$_3$, or MnF$_4$), and vanadium fluoride (VF$_3$, VF$_4$, VF$_5$), dissolved in a solvent, for example a low-polarity, aprotic solvent, like dimethyl ether (DME), hexane, toluene, and the like.

The prelithiated electrode material 170 with the coating precursor 180 travels from the second chamber 144 to a third reaction chamber 146. In the third reaction chamber 146, a vacuum is created and, as illustrated in FIG. 3, the prelithiated electrode material 170 with the coating precursor 180 is heated such that a conversion reaction occurs to form electronically conductive coating 190.

For example, when the solution includes copper fluoride (CuF$_2$) and the prelithiated electroactive material particles are prelithiated silicon-containing electroactive material particles, the conversion reaction may be defined by:

$$y(CuF_2) + Li_xSi \rightarrow 2y(LiF) + Li_{(x-2y)}Si + yCu$$

where x>2y (for example, 0≤y≤1.875 and 0≤x≤3.75) such that all of the copper fluoride (CuF$_2$) or the like is utilized.

In other instances, for example, when the solution includes titanium tetrafluoride (TiF$_4$) and the prelithiated electroactive material particles are prelithiated silicon-containing electroactive material particles, the conversion reaction may be defined by:

$$y(TiF_4) + Li_xSi \rightarrow 4y(LiF) + Li_{(x-4y)}Si + 4Ti$$

where x>4y (for example, 0≤y≤0.9375 and 0≤x≤3.75) such that all of the titanium tetrafluoride (TiF$_4$) or the like is utilized.

In further instances, for example, when the solution includes iron fluoride (FeF$_3$) and the prelithiated electroactive material particles are prelithiated silicon-containing electroactive material particles, the conversion reaction may be defined by:

$$y(FeF_3) + Li_xSi \rightarrow 3y(LiF) + Li_{(x-3y)}Si + 3Fe$$

where x>4y (for example, 0≤y≤1.25 and 0≤x≤3.75) such that all of the iron fluoride (FeF$_3$) or the like is utilized.

In still other instances, for example, when the solution includes nickel fluoride (NiF$_2$) and the prelithiated electroactive material particles are prelithiated silicon-containing electroactive material particles, the conversion reaction may be defined by:

$$y(NiF_2) + Li_xSi \rightarrow 2y(LiF) + Li_{(x-2y)}Si + yNi$$

where x>2y (for example, 0≤y≤1.875 and 0≤x≤3.75) such that all of the nickel fluoride (NiF$_2$) or the like is utilized.

In each instance, the amount of lithium prelithiated into the electroactive material particles (e.g., silicon-containing electroactive material particles) can be controlled such that copper fluoride (CuF$_2$) or the like can be fully reacted, while retaining sufficient lithium with the electroactive material particles so as to achieve desired energy densities.

Certain features of the current technology are further illustrated in the following non-limiting example.

EXAMPLE

An example cell can be prepared in accordance with various aspects of the present disclosure. The example cell can include prelithiated electroactive materials having electronically conductive coatings in accordance with various aspects of the present disclosure. For example, the example cell includes a prelithiated silicon-containing electroactive material (N/P ratio of about 2) having an electronically conductive coating disposed on surfaces thereof, where the electronically conductive coating includes a patterned configuration including a plurality of first regions comprising lithium fluoride and a plurality of second regions including copper.

A comparative cell can also be prepared. The comparative cell may include a silicon-containing electroactive material that is neither prelithiated nor includes an electronically conductive coating.

Figure 4:
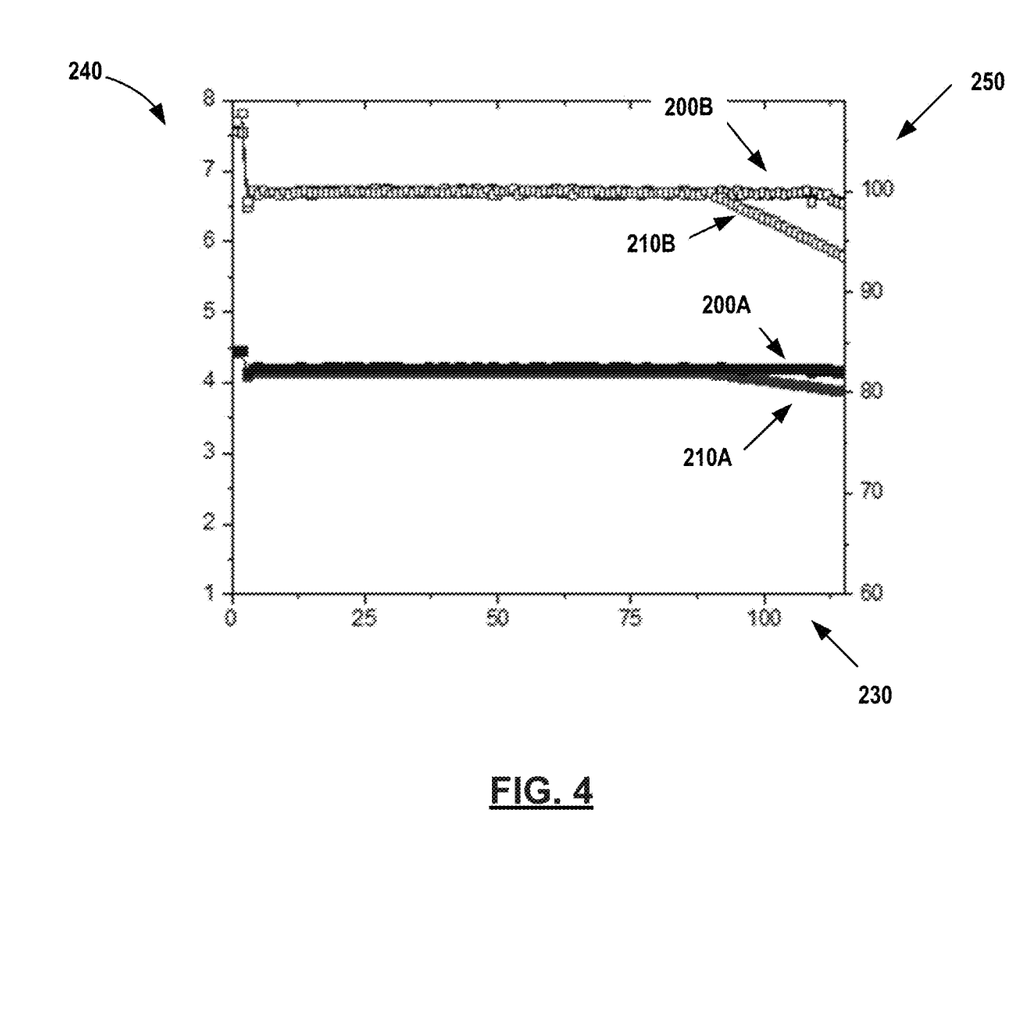
FIG. 4 is a graphical illustration of the discharge capacities and capacity retentions of comparative cells.

FIG. 4 illustrates the discharge capacities and capacity retentions of the example cell and the comparative cell. For example, line 200A represents the discharge capacity of the example cell and line 200B represents the capacity retention of the example cell. Line 210A represents the discharge capacity of the comparative cell and line 210B represents the capacity retention of the example cell. The x-axis 230 represents cycle number. The $y_1$-axis 240 represents discharge capacity (mAh/cm$^2$), and the $y_2$-axis 250 represents capacity retention (%). As illustrated, the example cell 200 has a 20% improvement in long capacity retention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for preparing an electrode material for use in an electrochemical cell, the method comprising:
   contacting an electroactive material precursor comprising a plurality of electroactive material particles with a solution so as to form an electronically conductive coating on each of the electroactive material particles, the coated electroactive material particles defining the electrode material,
   at least a portion of the plurality of electroactive material particles comprising a prelithiated electroactive material represented by Li$_x$Si where 0<x≤3.75,
   the solution comprising a solvent and one or more of copper fluoride (CuF$_2$), titanium tetrafluoride (TiF$_4$), titanium trifluoride (TiF$_3$), iron fluoride (FeF$_3$), nickel fluoride (NiF$_2$), manganese fluoride (MnF$_2$, MnF$_3$, or MnF$_4$), vanadium fluoride (VF$_3$, VF$_4$, VF$_5$), and combinations thereof,
   the electronically conductive coating comprising a plurality of first regions and a plurality of second regions,
   the plurality of first regions comprising lithium fluoride, and
   the plurality of second regions comprising one of copper, titanium, iron, nickel, manganese, and vanadium.

2. The method of claim 1, wherein the method further comprises prelithiating the electroactive material precursor.

3. The method of claim 2, wherein the electroactive material precursor is prelithiated using a thermal evaporation process.

4. The method of claim 1, wherein the solvent is selected from the group consisting of: dimethyl ether, hexane, toluene, and combinations thereof.

5. The method of claim 1, wherein contacting occurs using one of a spray process and a dip process.

6. The method of claim 1, wherein the method further comprises drying the coated electroactive material particles so as to remove the solvent.

7. The method of claim 1, wherein the method further comprises applying a vacuum infiltration process so as to surround the electroactive material precursor with the solution.

8. The method of claim 1, wherein the electronically conductive coating is a result of a conversion reaction between the solution and the electroactive material particles.

9. The method of claim 8, wherein the solution comprises copper fluoride (CuF$_2$), and the conversion reaction is defined as:

$$y(CuF_2) + Li_xSi \rightarrow 2y(LiF) + Li_{(x-2y)}Si + yCu$$

where x>2y.

10. A method for preparing an electrode material for use in an electrochemical cell, the method comprising:
    prelithiating a silicon-containing electroactive material precursor so as to form a prelithiated silicon-containing electroactive material represented by Li$_x$Si where 0<x≤3.75, and
    contacting the prelithiated silicon-containing electroactive material with a solution comprising a solvent and one or more of copper fluoride (CuF$_2$), titanium tetrafluoride (TiF$_4$), titanium trifluoride (TiF$_3$), iron fluoride (FeF$_3$), nickel fluoride (NiF$_2$), manganese fluoride (MnF$_2$, MnF$_3$, or MnF$_4$), and vanadium fluoride (VF$_3$, VF$_4$, VF$_5$) so as to form an electronically conductive coating on the prelithiated silicon-containing electroactive material so as to form a coated prelithiated electroactive material that defines the electrode material, the electronically conductive coating including a plurality of first regions and a plurality of second regions, the plurality of first regions comprising lithium fluoride and the plurality of second regions comprising one of copper, titanium, iron, nickel, manganese, and vanadium.

11. The method of claim 10, wherein the method further comprises drying the coated prelithiated electroactive material so as to remove the solvent.

12. The method of claim 10, wherein the method further comprises applying a vacuum infiltration process so as to surround the prelithiated silicon-containing electroactive material with the solution.

13. The method of claim 10, wherein the solvent is selected from the group consisting of: dimethyl ether, hexane, toluene, and combinations thereof.

14. The method of claim 10, wherein the electronically conductive coating is a result of a conversion reaction between the solution and the prelithiated silicon-containing electroactive material.

15. The method of claim 14, wherein the solution comprises copper fluoride (CuF$_2$), and the conversion reaction is defined as:

$$y(CuF_2) + Li_xSi \rightarrow 2y(LiF) + Li_{(x-2y)}Si + yCu$$

where x>2y.

* * * * *